(12) United States Patent
Taguchi et al.

(10) Patent No.: US 12,051,323 B2
(45) Date of Patent: Jul. 30, 2024

(54) STATUS MONITORING SYSTEM, MARINE VESSEL, AND STATUS MONITORING METHOD

(71) Applicant: MITSUBISHI HEAVY INDUSTRIES ENGINE & TURBOCHARGER, LTD., Sagamihara (JP)

(72) Inventors: Masaki Taguchi, Sagamihara (JP); Hirotaka Kuroda, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 126 days.

(21) Appl. No.: 17/602,155

(22) PCT Filed: Aug. 29, 2019

(86) PCT No.: PCT/JP2019/033947
§ 371 (c)(1),
(2) Date: Oct. 7, 2021

(87) PCT Pub. No.: WO2020/217559
PCT Pub. Date: Oct. 29, 2020

(65) Prior Publication Data
US 2022/0198917 A1     Jun. 23, 2022

(30) Foreign Application Priority Data
Apr. 24, 2019   (JP) .................. 2019-082946

(51) Int. Cl.
*G08C 17/02*   (2006.01)
*B63B 49/00*   (2006.01)
*B63B 73/00*   (2020.01)

(52) U.S. Cl.
CPC .............. *G08C 17/02* (2013.01); *B63B 49/00* (2013.01); *B63B 73/00* (2020.01)

(58) Field of Classification Search
CPC .... G08C 17/02; G08C 2201/51; B63B 49/00; B63B 73/00; B63B 79/00; H04Q 2209/40; H04Q 2209/50; H04Q 9/00
See application file for complete search history.

(56) References Cited

U.S. PATENT DOCUMENTS

2003/0109184 A1* 6/2003 Kanno ................. F02B 61/045
440/1
2005/0209746 A1* 9/2005 Kish ........................ G08G 3/00
701/21

(Continued)

FOREIGN PATENT DOCUMENTS

CN    203929111 U    11/2014
JP    2004-354183 A   12/2004

(Continued)

OTHER PUBLICATIONS

International Search Report for International Application No. PCT/JP2019/033947, dated Nov. 5, 2019, with English translation.

(Continued)

*Primary Examiner* — Adnan Aziz
(74) *Attorney, Agent, or Firm* — Birch, Stewart, Kolasch & Birch, LLP

(57) ABSTRACT

A measuring device measures a status of a device to be monitored stored within a metal hull of a marine vessel. A first communication device is provided outside the hull and transmits a status signal indicating a measurement value of the status of the device to be monitored. A second communication device receives the status signal via the first communication device and outputs information pertaining to the status. The second communication device is configured to be portable.

5 Claims, 9 Drawing Sheets

(56) References Cited

U.S. PATENT DOCUMENTS

| | | | |
|---|---|---|---|
| 2009/0111520 A1* | 4/2009 | Ring | G07C 5/008 455/557 |
| 2009/0171520 A1* | 7/2009 | Kaji | G05D 1/0206 701/21 |
| 2010/0127892 A1* | 5/2010 | Wesselink | H04Q 9/00 340/870.07 |
| 2011/0257819 A1 | 10/2011 | Chen et al. | |
| 2014/0286249 A1* | 9/2014 | Yamada | H04W 72/541 370/329 |
| 2015/0137993 A1 | 5/2015 | Terry | |
| 2015/0149074 A1* | 5/2015 | Lepisto | G05D 1/0005 701/410 |
| 2017/0045887 A1* | 2/2017 | Mazin | B63H 25/04 |
| 2017/0210449 A1* | 7/2017 | Frisbie | B63B 49/00 |
| 2017/0349259 A1 | 12/2017 | Kabel et al. | |
| 2019/0137618 A1* | 5/2019 | Hawker | G01S 19/45 |
| 2019/0291832 A1* | 9/2019 | Hashizume | B63H 25/02 |
| 2019/0339700 A1* | 11/2019 | Berg | B63H 9/061 |
| 2020/0073392 A1* | 3/2020 | Vanhakartano | G01C 21/20 |
| 2020/0211404 A1* | 7/2020 | Itabashi | G08G 5/0034 |
| 2020/0303819 A1* | 9/2020 | Kang | H04B 5/0037 |
| 2021/0350710 A1* | 11/2021 | Shimokawabe | G06F 3/04855 |

FOREIGN PATENT DOCUMENTS

| | | |
|---|---|---|
| JP | 2005-225375 A | 8/2005 |
| JP | 2007-128170 A | 5/2007 |
| JP | 3151038 U | 6/2009 |
| JP | 2014-94584 A | 5/2014 |
| KR | 10-2012-0108534 A | 10/2012 |
| WO | WO 2008/060150 A1 | 5/2008 |

OTHER PUBLICATIONS

Written Opinion of the International Searching Authority for International Application No. PCT/JP2019/033947, dated Nov. 5, 2019, with English translation.

* cited by examiner

STATUS MONITORING SYSTEM, MARINE VESSEL, AND STATUS MONITORING METHOD

TECHNICAL FIELD

The present invention relates to a status monitoring system, a marine vessel, and a status monitoring method.

The present application claims priority with respect to Japanese Patent Application No. 2019-082946 filed in Japan on Apr. 24, 2019, the contents of which are incorporated herein by reference.

BACKGROUND ART

PTL 1 discloses a technique of constructing a wireless sensor network for communicating measurement data in a large marine vessel.

CITATION LIST

Patent Literature [PTL 1] Japanese Unexamined Patent Application Publication No. 2014-94584

SUMMARY OF INVENTION

Technical Problem

A driver of a marine vessel watches a monitor installed in a pilothouse to monitor an operation situation.

Therefore, the driver cannot leave the pilothouse to monitor an operating situation and operate the marine vessel.

An object of the present invention is to provide a status monitoring system, a marine vessel, and a status monitoring method capable of monitoring an operation situation outside a pilothouse.

Solution to Problem

According to a first aspect of the present invention, a status monitoring system includes a measuring device that measures a status of a device to be monitored stored within a metal hull of a marine vessel, a first communication device provided outside the hull and transmitting a status signal indicating a measurement value of the status of the device to be monitored, and a portable second communication device that receives the status signal via the first communication device and that outputs information pertaining to the status.

According to a second aspect of the present invention, in the status monitoring system according to the first aspect, the second communication device may be provided inside an upper structure provided on the hull and having a non-metallic wall surface.

According to a third aspect of the present invention, in the status monitoring system according to the first or second aspect, the second communication device may be operated by electric power of a secondary battery. The status monitoring system may further include a charging device provided inside an upper structure, which is provided on the hull and has a non-metallic wall surface, and used for charging the secondary battery of the second communication device.

According to a fourth aspect of the present invention, in the status monitoring system according to any one of the first to third aspects, the second communication device may transmit a setting signal for setting one of a plurality of channels in an available frequency band as a transmission channel for the status signal to the first communication device and set a reception channel for receiving the status signal from among the plurality of channels.

According to a fifth aspect of the present invention, the status monitoring system according to any one of the first to fourth aspects further includes a control device that controls the device to be monitored. The second communication device may transmit a control instruction signal for instructing control of the device to be monitored. The first communication device may receive the control instruction signal and output the control instruction signal to the control device.

According to a sixth aspect of the present invention, in the status monitoring system according to the fifth aspect, the device to be monitored may include a main engine and a steering device of the marine vessel. The second communication device may receive inputs of a route of the marine vessel and an operation pattern of the main engine and transmit the control instruction signal for navigation according to the input route and operation pattern. The control device may control the steering device based on the route of the marine vessel and control the main engine based on the operation pattern.

According to a seventh aspect of the present invention, the status monitoring system according to the sixth aspect further includes a position measuring device that measures position information of the marine vessel. The second communication device may specify a route candidate based on the position information measured during a period from a drive start time to a drive end time of the main engine, and receive the input of the route of the marine vessel with selection of the route candidate.

According to an eighth aspect of the present invention, a marine vessel includes a metal hull, a main engine and a steering device, which are devices to be monitored stored within the hull, and the status monitoring system according to any one of the first to seventh aspects.

According to a ninth aspect of the present invention, a status monitoring method includes a step of measuring a status of a device to be monitored stored within a metal hull of a marine vessel via a measuring device, a step of transmitting a status signal indicating a measurement value of the status of the device to be monitored, via a first communication device provided outside the hull, a step of receiving the status signal via the first communication device via a second communication device used outside the hull, and a step of outputting information pertaining to the status via the second communication device.

Advantageous Effects of Invention

According to the above aspects, the status monitoring system can monitor the operation situation at any place outside the hull by using the second communication device.

DESCRIPTION OF EMBODIMENTS

First Embodiment

<<Configuration of Marine Vessel>>

Figure 1:
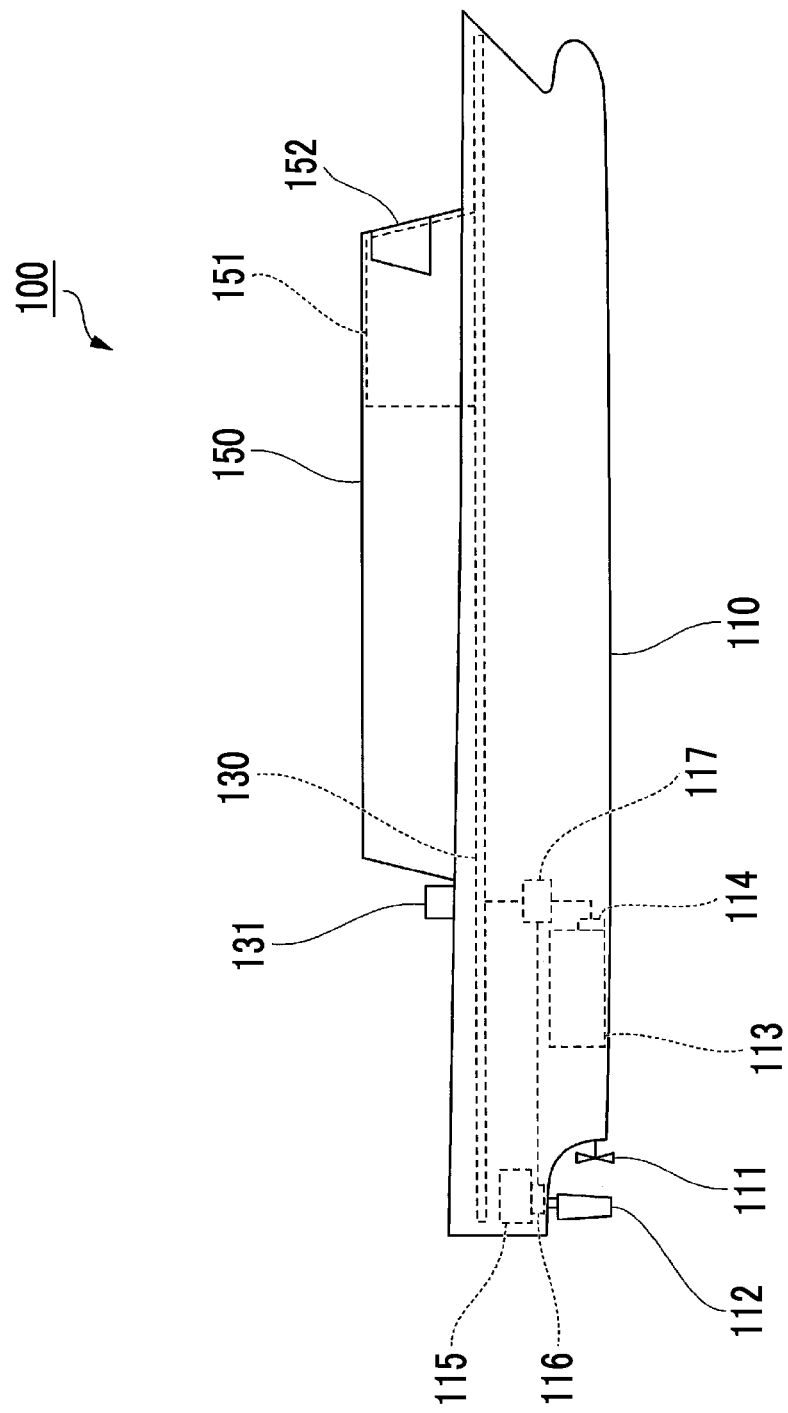
FIG. 1 is a schematic view of a configuration of a marine vessel according to a first embodiment.

FIG. 1 is a schematic view of a configuration of a marine vessel according to a first embodiment.

A marine vessel 100 includes a hull 110, a deck 130 that covers an upper part of the hull 110, and an upper structure 150 provided on an upper part of the deck 130. The hull 110, the deck 130, and the upper structure 150 are made of steel, aluminum, or another metal. A pilothouse 151 is formed inside the upper structure 150. A window 152 is provided on a wall surface of the upper structure 150 corresponding to a front surface of the pilothouse 151. The window 152 is an example of a non-metallic wall surface.

The hull 110 is provided with a propeller 111 and a rudder 112. A main engine 113, a rotation sensor 114, a steering gear 115, a rudder angle sensor 116, and a signal processing device 117 are provided inside the hull 110.

The main engine 113 is, for example, a diesel engine. A main shaft of the main engine 113 rotates the propeller 111. The rotation sensor 114 measures a rotation speed of the main shaft of the main engine 113. The steering gear 115 applies rotational force to the rudder 112. The steering gear 115 is driven by, for example, a hydraulic pressure. The rudder angle sensor 116 measures a rudder angle of the rudder 112. The signal processing device 117 processes measurement values of the rotation sensor 114 and the rudder angle sensor 116. For example, the signal processing device 117 converts analog signals output by the rotation sensor 114 and the rudder angle sensor 116 into digital signals.

The main engine 113 and the steering gear 115 are examples of a device to be monitored. The rotation sensor 114 and the rudder angle sensor 116 are examples of a measuring device.

A first communication device 131 connected to the signal processing device 117 by wire or wirelessly is provided on an upper surface of the deck 130. The first communication device 131 transmits a status signal indicating the measurement value processed by the signal processing device 117 to the upper part of the deck 130, that is, to the outside of the hull 110, via wireless communication. The first communication device 131 transmits the status signal using, for example, a radio wave in a 920 MHz band (sub-giga band).

The deck 130 is provided with a hole for communicably connecting the signal processing device 117 and the first communication device 131. In a case where the signal processing device 117 and the first communication device 131 are connected by wire, a communication cable is arranged via the hole. When the signal processing device 117 and the first communication device 131 are wirelessly connected, the hole allows a wireless signal to pass through. Therefore, it is preferable that an antenna of the first communication device 131 is provided directly above the hole or so as to penetrate the hole.

<<Configuration of Pilothouse>>

Figure 2:
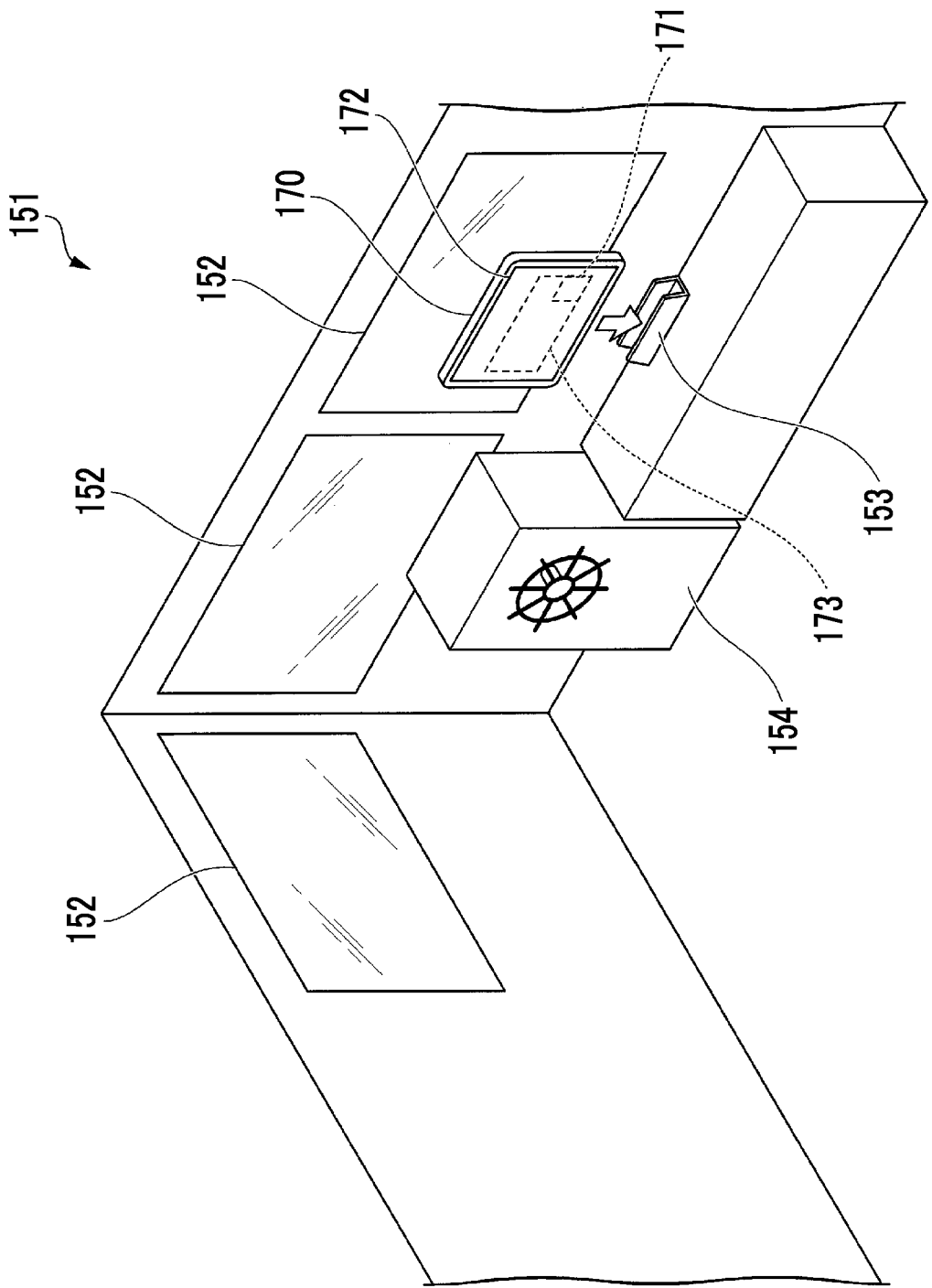
FIG. 2 is a perspective view of a configuration of the inside of a pilothouse of the marine vessel according to the first embodiment.

FIG. 2 is a perspective view of a configuration of the inside of the pilothouse of the marine vessel according to the first embodiment.

A second communication device 170, a charging device 153, and a steering control device 154 are provided in the pilothouse 151 of the upper structure 150.

The second communication device 170 receives the status signal from the first communication device 131 via wireless communication and displays information indicating statuses of the main engine 113 and the steering gear 115. The second communication device 170 includes a calculation device 171, a touch panel 172, and a secondary battery 173. The secondary battery 173 supplies electric power for operating the second communication device 170. For example, a tablet terminal can be used as the second communication device 170. That is, the second communication device 170 is configured to be portable. "Portable" means that it can be operated without at least providing a power supply device outside a housing.

The charging device 153 is a cradle for charging the secondary battery 173 of the second communication device 170. A terminal (not shown) provided in the second communication device 170 is fitted to a terminal (not shown) of the charging device 153 to perform the charging from the charging device 153 to the secondary battery 173. The charging device 153 is provided near the window 152 and along the window 152. Since the window 152 is made of a non-metal (dielectric) such as glass, the window 152 allows the radio wave to pass through. Therefore, with the charging device 153 provided along the window 152, the second communication device 170 set in the charging device 153 can receive the wireless signal transmitted by the first communication device 131 via the window 152. In particular, since the sub-giga band wireless signal has a property of wrapping around an obstacle as compared with a higher frequency wireless signal, the wireless signal can reach the inside of the pilothouse 151 even in a case where the window 152 and the first communication device 131 do not face each other.

The steering control device 154 receives an operation of a steering wheel, a lever, or the like by a driver and outputs a control signal instructing the steering gear 115 in regard to the rudder angle.

That is, according to the first embodiment, the driver of the marine vessel 100 can monitor a status of the marine vessel 100 at any place by removing the second communication device 170 from the charging device 153. On the other hand, the driver of the marine vessel 100 can charge the second communication device 170 and monitor the status of the marine vessel 100 inside of the pilothouse 151 by attaching the second communication device 170 to the charging device 153. Accordingly, the driver can perform a steering operation using the steering control device 154 while monitoring the status of the marine vessel 100 even while the second communication device 170 is being charged. That is, even in a case where a charging amount of the secondary battery 173 is less than a sufficient amount for operating the second communication device 170, the status of the marine vessel 100 can be monitored at least when the steering operation is performed.

<<Configuration of Second Communication Device>>

Figure 3:
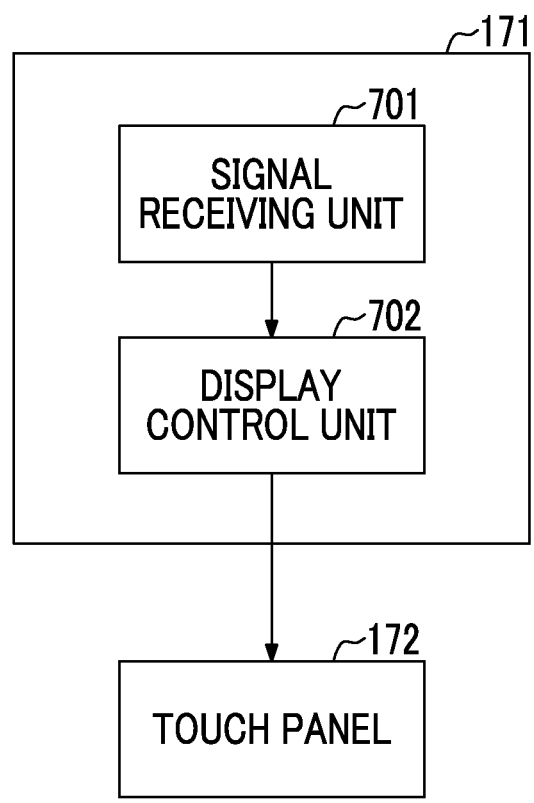
FIG. 3 is a schematic block diagram showing a configuration of a calculation device of a second communication device according to the first embodiment.

FIG. 3 is a schematic block diagram showing a configuration of the calculation device of the second communication device according to the first embodiment.

The calculation device 171 of the second communication device 170 includes a signal receiving unit 701 and a display control unit 702. The signal receiving unit 701 receives the status signal from the first communication device 131. The display control unit 702 generates a display screen based on the received status signal and outputs the screen to the touch panel 172.

<<Action/Effect>>

In the first embodiment, the rotation sensor 114, the rudder angle sensor 116, the signal processing device 117, the first communication device 131, the second communication device 170, and the charging device 153 constitute the status monitoring system.

With the status monitoring system according to the first embodiment, the status signal indicating the status of the steering gear 115 is transmitted from the first communication device 131 provided outside the hull 110 to the portable second communication device 170. Accordingly, the driver of the marine vessel 100 can monitor the operation situation at any place outside the hull by using the second communication device 170 even when the hull 110 is made of metal.

According to the first embodiment, the second communication device 170 is provided inside the upper structure 150 having the window 152, which is the non-metallic wall surface. Since the wireless signal from the first communication device 131 can reach the inside of the upper structure 150 via the window 152, the driver can use the second communication device 170 inside of the upper structure 150.

The status monitoring system according to the first embodiment is provided inside the upper structure 150 having the window 152 and includes the charging device 153 for charging the secondary battery 173 of the second communication device 170. Accordingly, the second communication device 170 can receive the wireless signal from the first communication device 131 even while the secondary battery 173 is being charged. That is, the driver can monitor the status of the marine vessel 100 while the second communication device 170 is being charged.

Second Embodiment

With the status monitoring system according to the first embodiment, the second communication device 170 displays information about one marine vessel 100. On the contrary, with a status monitoring system of a second embodiment, the second communication device 170 can display information about a plurality of marine vessels 100 operating in the vicinity.

<<Configuration of Second Communication Device>>

Figure 4:
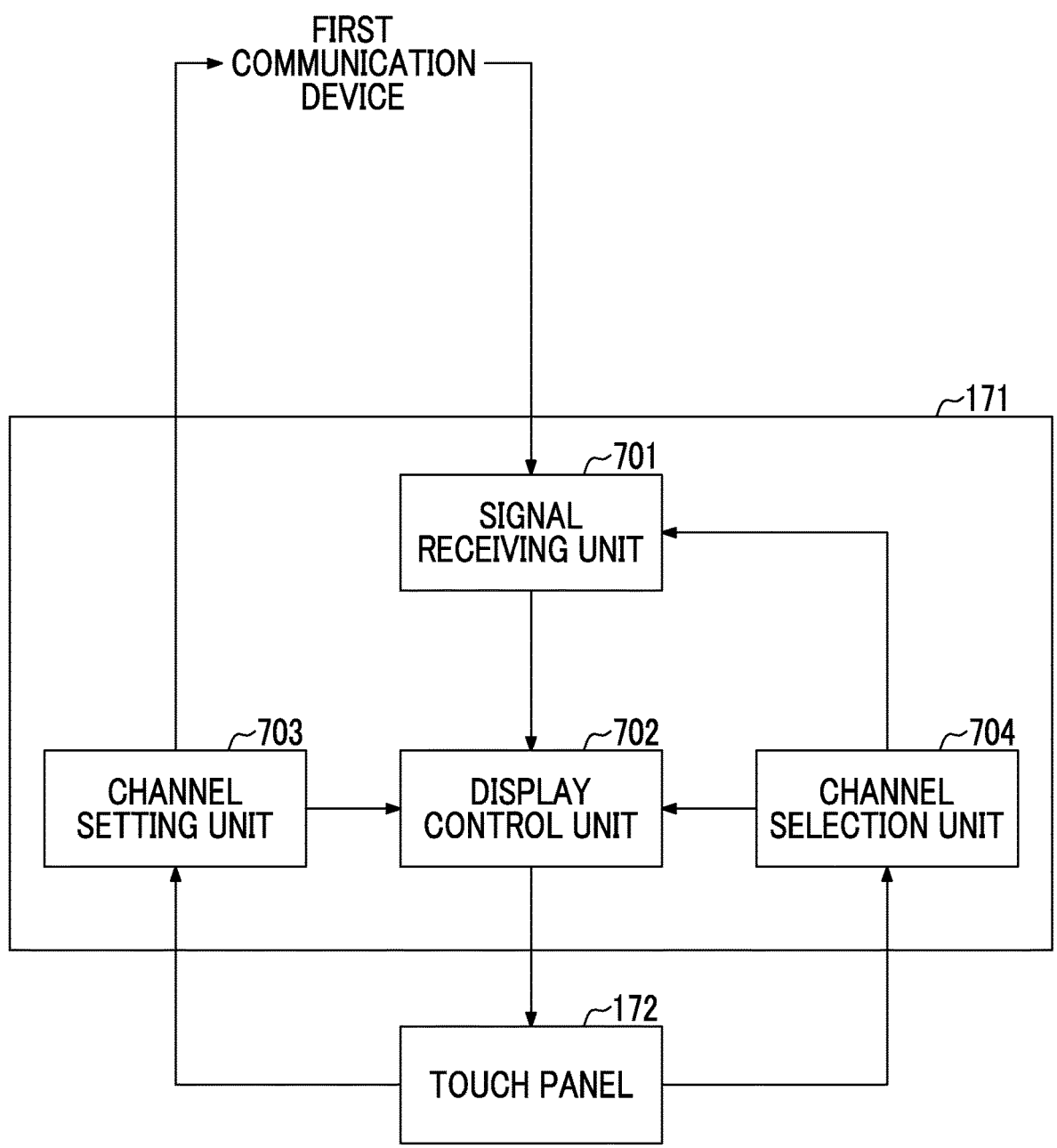
FIG. 4 is a schematic block diagram showing a configuration of a calculation device of a second communication device according to a second embodiment.

FIG. 4 is a schematic block diagram showing a configuration of a calculation device of the second communication device according to the second embodiment.

The calculation device 171 according to the second embodiment further includes a channel setting unit 703 and a channel selection unit 704, in addition to the configuration of the first embodiment.

The channel setting unit 703 transmits a setting signal for setting a channel selected by a user from a plurality of channels in the sub-giga band as a transmission channel for the status signal via the touch panel 172 to the first communication device 131. A setting screen of the transmission channel is generated by the display control unit 702 and is displayed on the touch panel 172. The setting screen of the transmission channel includes a list of a plurality of available channels.

The channel selection unit 704 sets a channel selected, among channels capable of capturing a signal, by the user via the touch panel 172 as a reception channel for the signal receiving unit 701. A selection screen of the reception channel is generated by the display control unit 702 and is displayed on the touch panel 172. The selection screen of the reception channel includes a list of a plurality of capturable channels. The capturable channel is specified, for example, by the signal receiving unit 701 scanning each channel.

<<Action/Effect>>

According to the second embodiment, the second communication device 170 can select a channel required to receive the status signal from the plurality of channels. In a situation where the plurality of marine vessels 100 are running in parallel, a case where the transmission channel of each of the marine vessels 100 is set to a different channel in advance by the channel setting unit 703 will be described. In this case, the driver of one marine vessel 100 can recognize status information of another marine vessel 100 in the vicinity by operating the second communication device 170 and switching the reception channel.

Accordingly, the driver can easily confirm the information of another marine vessel 100, for example, in a case when commanding the operation of the plurality of marine vessels 100.

Third Embodiment

With the status monitoring system according to the first embodiment, the marine vessel 100 is steered by the steering control device 154. On the contrary, with a status monitoring system of a third embodiment, the marine vessel 100 can be steered by the operation of the second communication device 170. With the status monitoring system of the third embodiment, it is possible to refer to a past navigation history via the operation of the second communication device 170 to steer the marine vessel along the same route. The navigation history is an example of a route candidate.

<<Configuration of Marine Vessel>>

Figure 5:
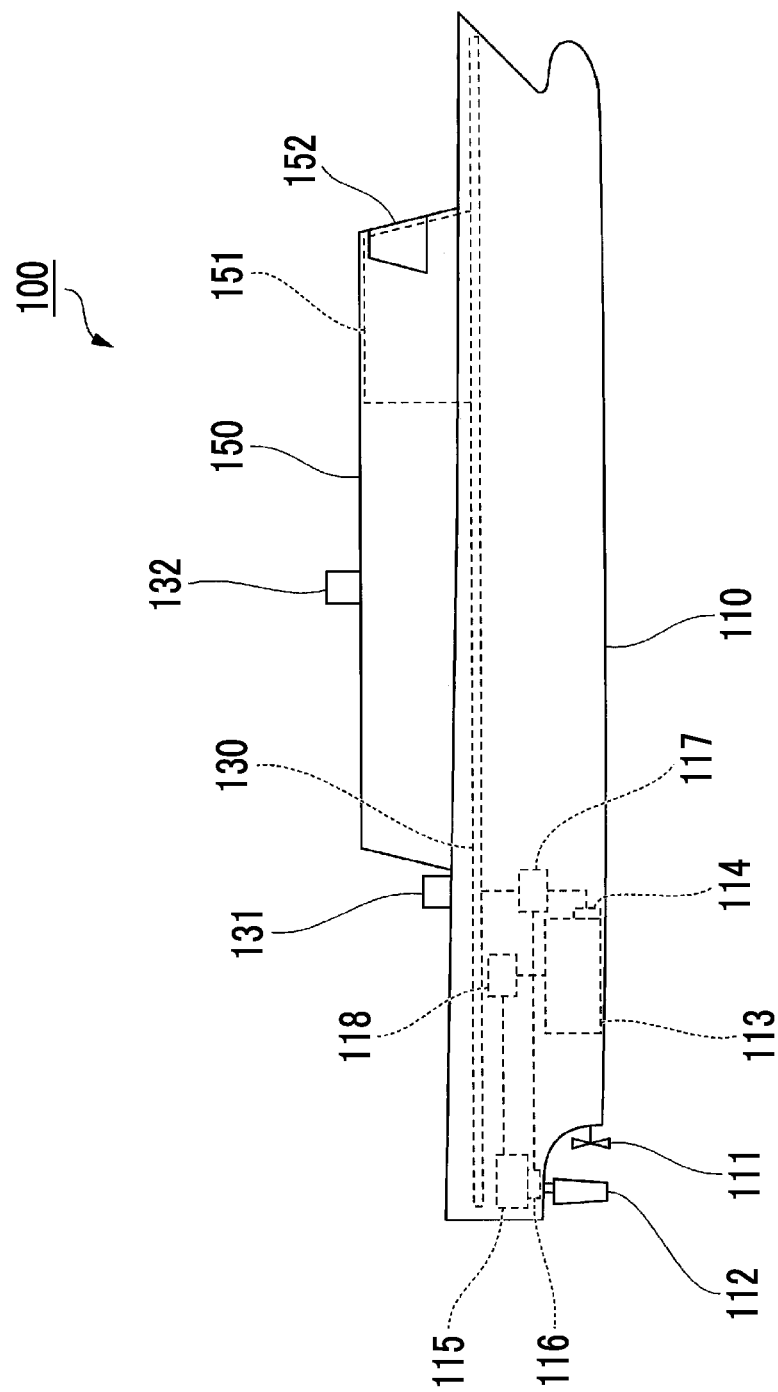
FIG. 5 is a schematic view of a configuration of a marine vessel according to a third embodiment.

FIG. 5 is a schematic view of a configuration of a marine vessel according to the third embodiment.

The marine vessel 100 according to the third embodiment further includes a control device 118 and a positioning device 132, in addition to the configuration of the first embodiment.

The control device 118 controls the main enuine 113 and the steering gear 115 according to an instruction received from the second communication device 170 via the first communication device 131.

The positioning device 132 measures a position of the marine vessel 100 based on a global navigation satellite system (GNSS) signal.

<<Configuration of Second Communication Device>>

Figure 6:
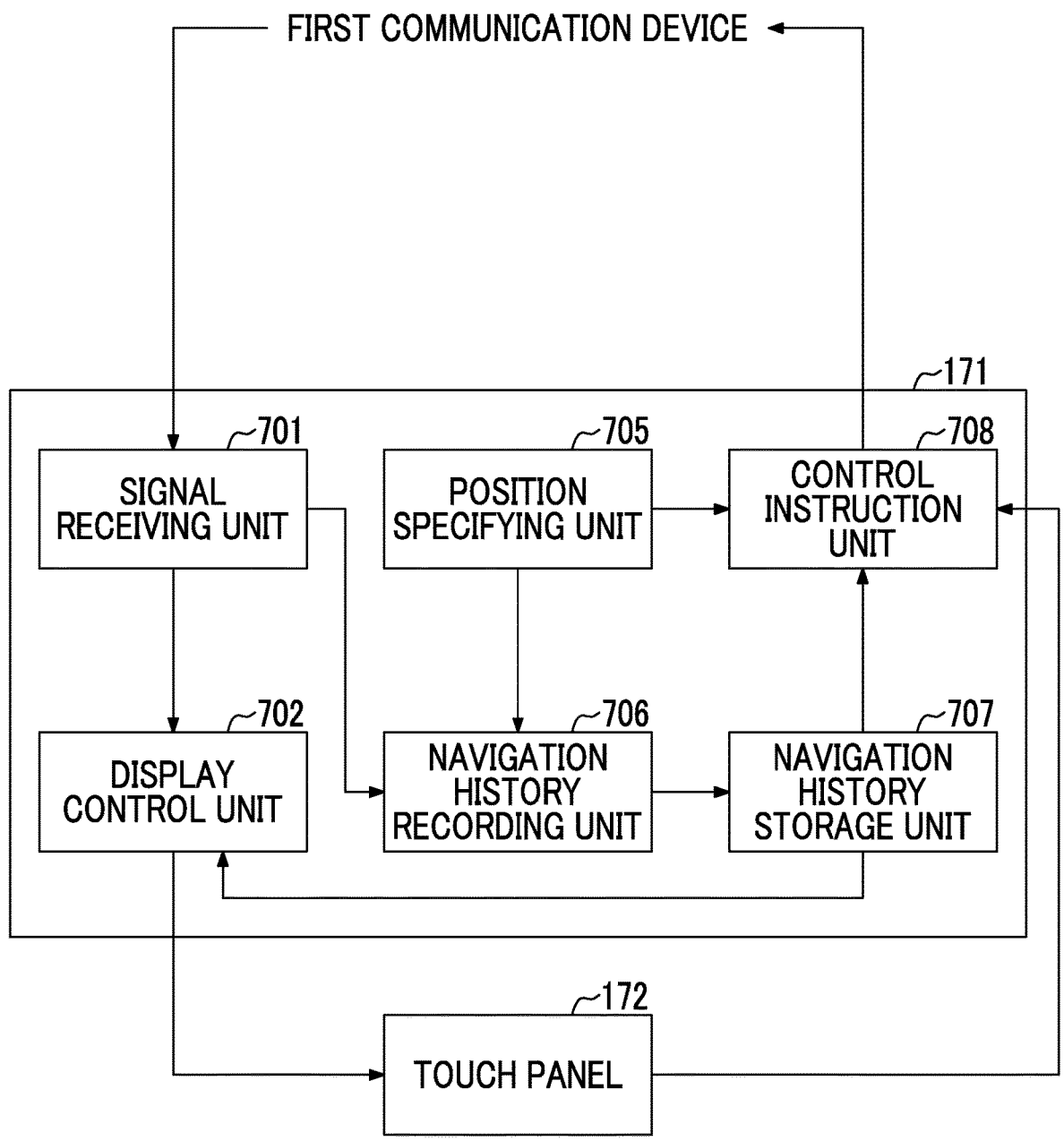
FIG. 6 is a schematic block diagram showing a configuration of a calculation device of a second communication device according to the third embodiment.

FIG. 6 is a schematic block diagram showing a configuration of a calculation device of the second communication device according to the third embodiment.

The calculation device 171 according to the third embodiment further includes a position specifying unit 705, a navigation history recording unit 706, a navigation history storage unit 707, and a control instruction unit 708, in addition to the configuration of the first embodiment.

The position specifying unit 705 acquires position information of the marine vessel 100 from the positioning device 132.

The navigation history recording unit 706 specifies the navigation history of the marine vessel 100 based on the status information received by the signal receiving unit 701 and the position information specified by the position specifying unit 705, and records the navigation history in the navigation history storage unit 707. The navigation history is indicated by the position information and a time series of the rotation speed of the main engine 113. Specifically, the navigation history recording unit 706 specifies a drive start time and drive end time of the main engine 113, based on the rotation speed of the main engine 113 indicated by the received status information, and specifies the position information and the rotation speed of the main engine 113 from the drive start time to the drive end time in a time series to specify the navigation history.

The control instruction unit 708 generates a control signal for controlling the rudder angle of the steering gear 115 and the rotation speed of the main engine 113 based on one navigation history selected from among a plurality of navigation histories stored in the navigation history storage unit 707, and transmits the generated signal to the first communication device 131. Specifically, the control instruction unit 708 generates the control signal according to the following procedure. The control instruction unit 708 reads out the selected navigation history in chronological order and determines the latest target position. The control instruction unit 708 determines the rotation speed of the main engine 113 associated with the specified target position as a target rotation speed in the selected navigation history. The control instruction unit 708 determines a target rudder angle based on a deviation amount between the position information specified by the position specifying unit 705 and the target position. The determination of the target rudder angle is realized by, for example, an auto cruise function. The control instruction unit 708 generates the control signal indicating the determined target rotation speed and target rudder angle.

<<Method of Specifying Navigation History>>

Figure 7:
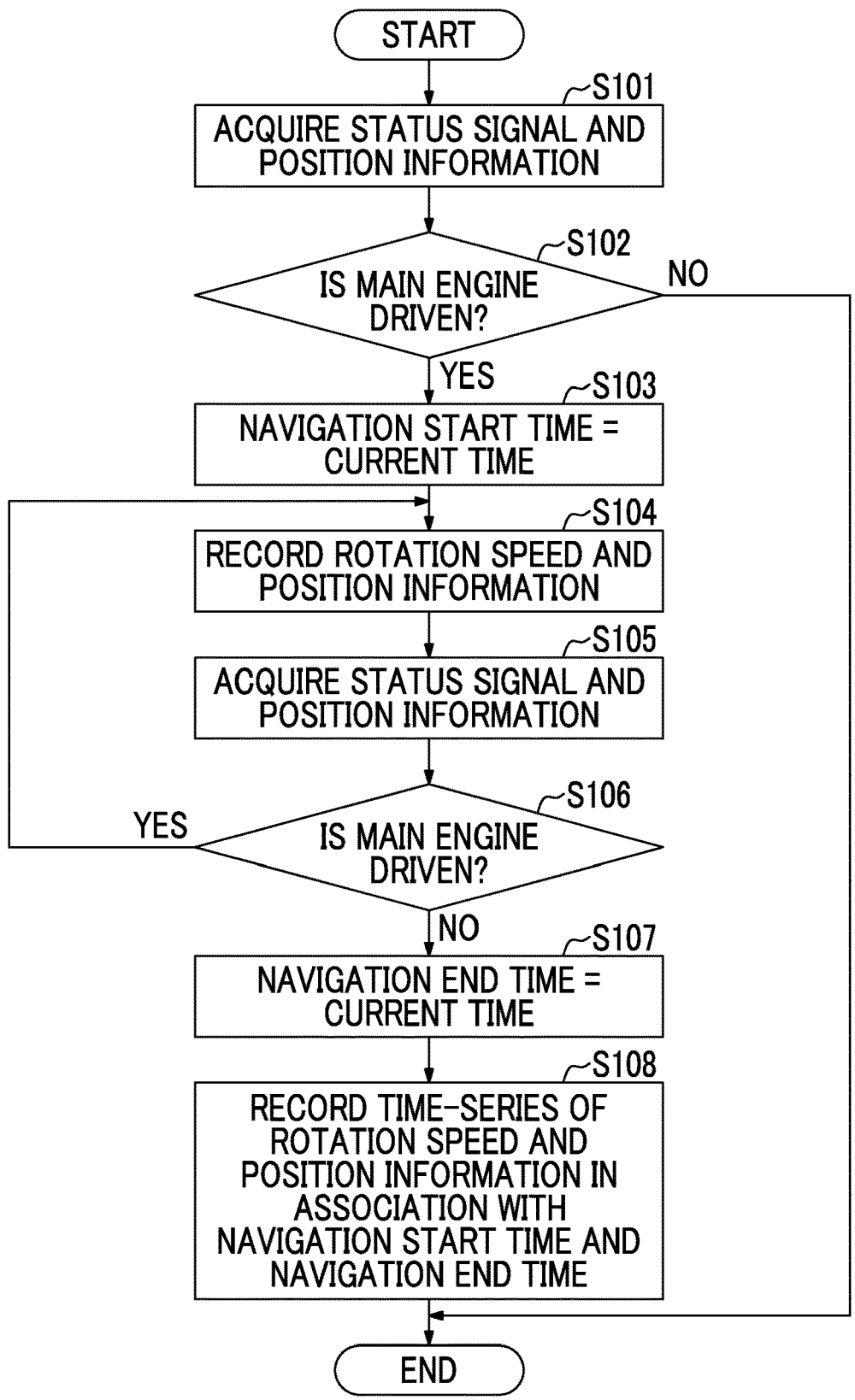
FIG. 7 is a flowchart showing a method of specifying a navigation history according to the third embodiment.

FIG. 7 is a flowchart showing a method of specifying the navigation history according to the third embodiment.

When the signal receiving unit 701 receives the status signal and the position specifying unit 705 acquires the position information (step S101), the navigation history recording unit 706 refers to the rotation speed of the main engine 113 included in the status information to determine whether or not the main engine 113 is driven (step S102). For example, the navigation history recording unit 706 determines that the main engine 113 is driven in a case where the rotation speed of the main engine 113 is equal to or higher than a predetermined threshold value. When determination is made that the main engine 113 is not driven (step S102: NO), the navigation history recording unit 706 ends the processing without recording the navigation history.

On the other hand, when determination is made that the main engine 113 is driven (step S102: YES), the navigation history recording unit 706 specifies a current time as a navigation start time (step S103). The navigation history recording unit 706 records the rotation speed of the main engine 113 included in the acquired position information and the received status information in an internal memory (step S104).

In a next calculation cycle, when the signal receiving unit 701 receives the status signal and the position specifying unit 705 acquires the position information (step S105), the navigation history recording unit 706 refers to the rotation speed of the main engine 113 included in the status information to determine whether or not the main engine 113 is driven (step S106). When determination is made that the main engine 113 is driven (step S106: YES), the navigation history recording unit 706 returns to step S104 and holds the position information and the rotation speed of the main engine 113 in the internal memory. In this case, the navigation history recording unit 706 adds the new position information and rotation speed of the main engine 113 to an end of the position information and the rotation speed of the main engine 113, which are already held in the internal memory, to hold the position information and the rotation speed of the main engine 113 in the internal memory as a time series.

When determination is made that the main engine 113 is not driven (step S106: NO), the navigation history recording unit 706 specifies a current time as a navigation end time (step S107). The navigation history recording unit 706 records the time series of the position information and the rotation speeds of the main engine 113 held in the internal memory in the navigation history storage unit 707 in association with the navigation start time specified in step S103 and the navigation end time specified in step S107 (step S108).

With the repeated execution of the above processing for each navigation, the plurality of navigation histories are recorded in the navigation history storage unit 707.

<<Automatic Marine Vessel Steering Method>>

Figure 8:
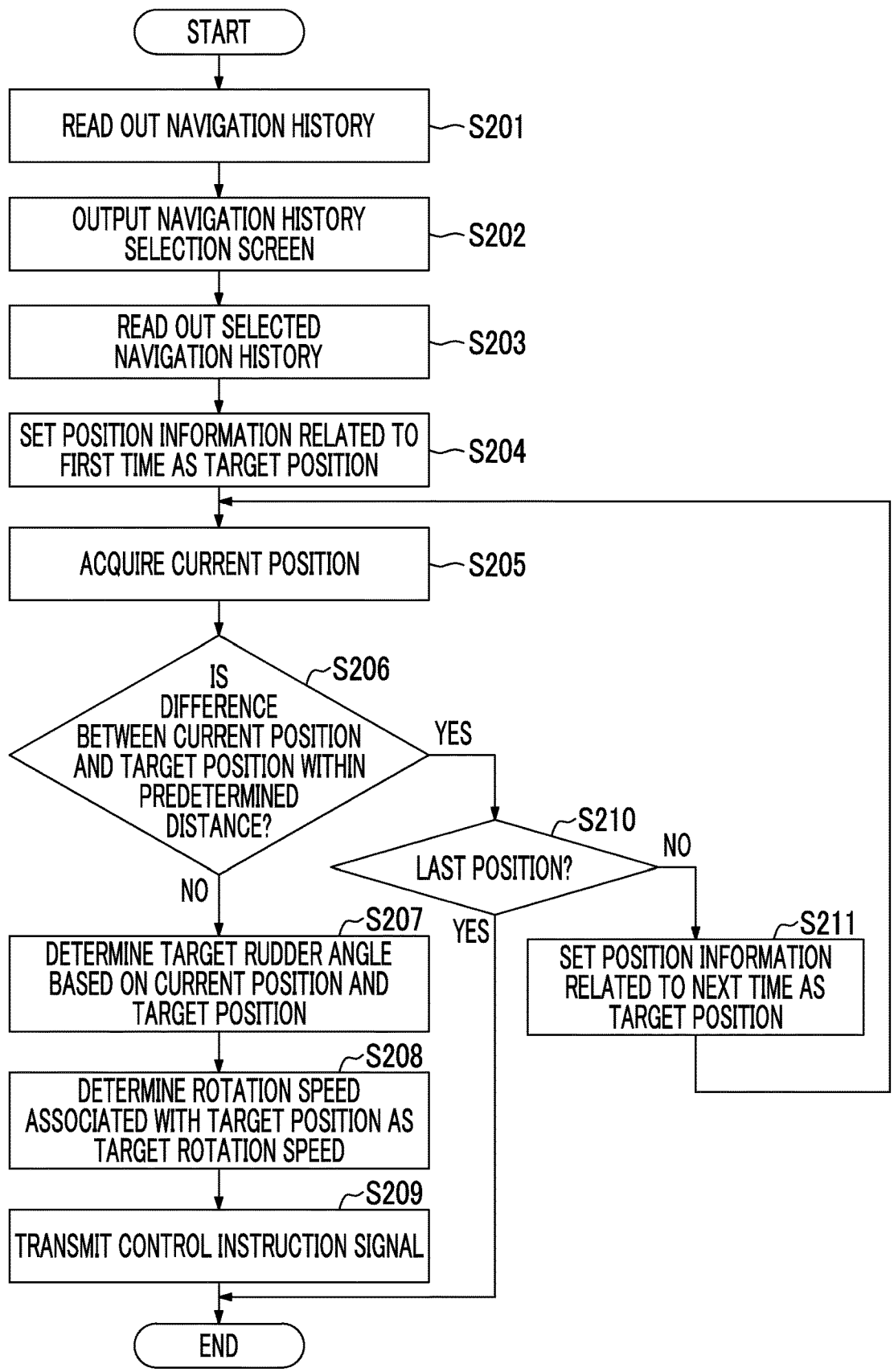
FIG. 8 is a flowchart showing an automatic marine vessel steering method according to the third embodiment.

FIG. 8 is a flowchart showing an automatic marine vessel steering method according to the third embodiment.

When an automatic marine vessel steering function of the second communication device 170 is activated by the user, the display control unit 702 reads out the plurality of navigation histories from the navigation history storage unit 707 (step S201). A navigation history selection screen including a list of navigation histories is generated and output to the touch panel 172 (step S202). On the navigation history selection screen, for example, the route is drawn on a map in a superimposed manner in association with the navigation start time and the navigation end time. The driver selects one route from the navigation history selection screen and inputs the selected route to the touch panel 172.

The control instruction unit 708 reads out the navigation history selected from the plurality of navigation histories stored in the navigation history storage unit 707 based on the input to the touch panel 172 (step S203). The control instruction unit 708 specifies the position information pertaining to a first time of the navigation history as the target position (step S204). The position specifying unit 705 acquires position information indicating the current position from the positioning device 132 (step S205). The control instruction unit 708 determines whether or not a difference between the target position specified in step S204 and the current position acquired in step S205 is within a predetermined distance (step S206).

In a case where the difference between the target position and the current position is not within the predetermined distance (step S206: NO), the control instruction unit 708 determines the target rudder angle based on the target position and the current position (step S207). The control instruction unit 708 determines the rotation speed of the main engine 113 associated with the target position in the navigation information as the target rotation speed (step S208). The control instruction unit 708 generates a control instruction signal based on the determined target rudder angle and target rotation speed, and transmits the generated signal to the first communication device 131 (step S209). The first communication device 131 outputs the control instruction signal to the control device 118, and the control device 118 controls the main engine 113 and the steering gear 115. The second communication device 170 returns the processing to step S205 and generates the control instruction signal based on the target position.

In a case where the difference between the target position and the current position is within the predetermined distance in step S206 (step S206: YES), the control instruction unit 708 determines whether or not the current target position is the position information pertaining to the last time of the navigation information (step S210). In a case where the current target position is not the position information pertaining to the last time of the navigation information (step S210: NO), the control instruction unit 708 changes the target position to a position indicated by next position information (step S211). The processing returns to step S205, and the control instruction signal is generated based on the new target position.

In a case where the current target position is the position information pertaining to the last time of the navigation information in step S210 (step S210: YES), the destination is reached. Therefore, the second communication device 170 ends the automatic marine vessel steering processing.

<<Action/Effect>>

As described above, with the status monitoring system according to the third embodiment, the second communication device 170 transmits the control instruction signal instructing the control of the main engine 113 and the steering gear 115, and the first communication device 131 receives the control instruction signal and outputs the signal to the control device 118. Accordingly, the driver can perform a marine vessel steering operation at any place outside the hull by removing the second communication device 170 from the charging device 153.

The second communication device 170 receives the input of the navigation history, which is the time series of the route of the marine vessel 100 and the rotation speed of the main engine 113, and transmits the control instruction signal for navigation according to the input navigation history. Accordingly, the second communication device 170 can navigate the marine vessel 100 according to a past route and an operation pattern of the main engine 113. In particular, with the steering control based on the history of position information regardless of the history of steering, it is possible to appropriately navigate the marine vessel 100 even in a case where a tide flow is different from the time of navigation related to the navigation history. In the third embodiment, the control instruction unit 708 determines the rudder angle based on the target position and the position information, but the present invention is not limited thereto. For example, in a case where the control device 118 has an auto cruise function, the control instruction unit 708 may transmit the target position, and the control device 118 may determine the rudder angle based on the target position. In another embodiment, the second communication device 170 may receive the input of manual marine vessel steering instead of automatic marine vessel steering.

The second communication device 170 specifies the navigation history based on the position information measured during a period from the drive start time to drive end time of the main engine 113, and receives the input of the route of the marine vessel 100 with the selection of the navigation history. Accordingly, the second communication device 170 can record the navigation history without making the driver aware of the recording of the navigation history. In another embodiment, the second communication device 170 may receive inputs of a navigation start and a navigation end and may specify the navigation history based on the position information measured during a period from the navigation start to the navigation end.

The status monitoring system according to the third embodiment performs the marine vessel steering operation for one marine vessel 100, but the present invention is not limited thereto. For example, in another embodiment, the plurality of marine vessels may be steered by one second communication device 170 with the status monitoring system having the channel selection function according to the second embodiment in addition to the marine vessel steering function according to the third embodiment.

Another Embodiment

Although one embodiment is described in detail with reference to the drawings, the specific configuration is not limited to the above, and various design changes and the like can be made. For example, in another embodiment, the order of the above processing may be changed as appropriate. Some processing may be executed in parallel.

The second communication device 170 according to another embodiment may include a relay device in addition to or in place of the charging device 153 along the window 152. In this case, the second communication device 170 can display the status of the marine vessel 100 even at a position away from the window 152 by receiving the status signal transmitted by the first communication device 131 via the relay device. In another embodiment, the relay device may be provided in the hull 110 (for example, engine room). Accordingly, the driver can display the status of the marine vessel 100 using the second communication device 170 even inside the hull.

In another embodiment, the status monitoring system may include two or more second communication devices 170. However, in a case where the marine vessel steering is performed by using the second communication device 170 as in the third embodiment, it is necessary to set one second communication device 170 capable of implementing the marine vessel steering function.

<Computer Configuration>

Figure 9:
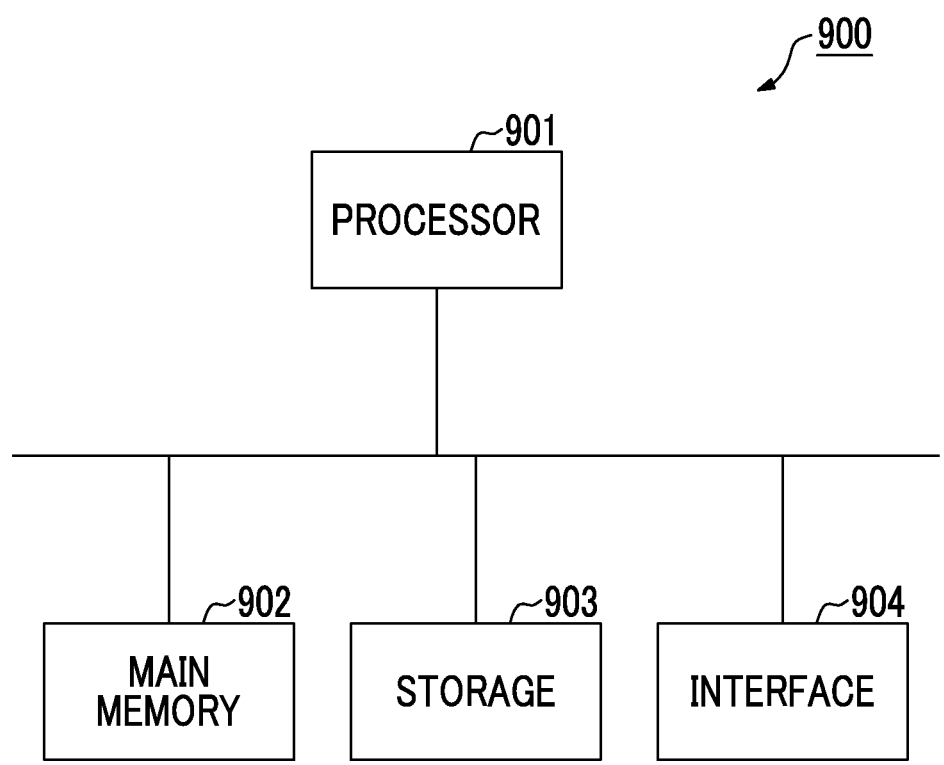
FIG. 9 is a schematic block diagram showing a configuration of a computer according to at least one embodiment.

FIG. 9 is a schematic block diagram showing a configuration of a computer according to at least one embodiment.

The computer 900 includes a processor 901, a main memory 902, a storage 903, and an interface 904.

The calculation device 171 and the control device 118 described above are mounted on the computer 900. The operation of each processing unit described above is stored in the storage 903 in the form of a program. The processor 901 reads out the program from the storage 903, expands the program in the main memory 902, and executes the above processing according to the program. The processor 901 ensures a storage area corresponding to each of the storage units described above in the main memory 902 according to the program. Examples of the processor 901 include a central processing unit (CPU), a graphic processing unit (GPU), and a microprocessor.

The program may be intended to realize some of the functions performed by the computer 900. For example, the program may perform the function in combination with another program already stored in the storage or in combination with another program mounted on another device. In another embodiment, the computer 900 may include a custom large scale integrated circuit (LSI) such as a programmable logic device (PLD) in addition to or in place of the above configuration. Examples of PLDs include a programmable array logic (PAL), a generic array logic (GAL), a complex programmable logic device (CPLD), and a field programmable gate array (FPGA). In this case, some or all of the functions realized by the processor 901 may be realized by the integrated circuit. Such integrated circuits are also included as an example of the processor.

Examples of the storage 903 include a hard disk drive (HDD), a solid state drive (SSD), a magnetic disk, an optical magnetic disk, a compact disc read only memory (CD-ROM), a digital versatile disc read only memory (DVD-ROM), and a semiconductor memory. The storage 903 may be an internal medium directly connected to a bus of the computer 900 or may be an external medium connected to the computer 900 via the interface 904 or a communication line. In a case where the program is distributed to the computer 900 via the communication line, the computer 900 that receives the distribution may expand the program into the main memory 902 and execute the above processing. In at least one embodiment, the storage 903 is a non-transitory tangible storage medium.

The program may be for realizing some of the functions described above. Further, the program may be a so-called difference file (difference program) that realizes the above functions in combination with another program already stored in the storage 903.

INDUSTRIAL APPLICABILITY

The status monitoring system can monitor the operation situation at any place outside the hull.

REFERENCE SIGNS LIST

100: marine vessel
110: hull
111: propeller
112: rudder
113: main engine
114: rotation sensor
115: steering gear
116: rudder angle sensor
117: signal processing device
118: control device
130: deck
131: first communication device
132: positioning device
150: upper structure
151: pilothouse
152: window
153: charging device
154: steering control device
170: second communication device
173: secondary battery
171: calculation device
172: touch panel
701: signal receiving unit
702: display control unit
703: channel setting unit
704: channel selection unit
705: position specifying unit
706: navigation history recording unit
707: navigation history storage unit
708: control instruction unit
900: computer
901: processor
902: main memory
903: storage
904: interface

The invention claimed is:
1. A status monitoring system comprising:
a measuring device that measures a status of a device to be monitored stored within a metal hull that is included by a marine vessel;
a first communication device that is provided outside the hull, the first communication device acquiring a status signal from a signal processing device that is provided inside the hull via a hole for wired or wireless communication, and transmitting the acquired status signal using a first channel, the first channel being selected by a user of a portable second communication device for setting one of transmission channels for the status signal, the hole being included by a deck that covers an upper part of the hull, the status signal indicating a measurement value of the status of the device to be monitored; and
the portable second communication device that:
sets a second channel according to selection of the second channel by the user, the second channel being a reception channel that is configured to receive a signal through a transmission channel set for one of marine vessels when each of the transmission channels set for the marine vessels is a different channel;
that transmits the selected first channel for the status signal to the first communication device;
that generates a display screen based on the received status signal via the first communication device; and
that outputs the screen to a display unit.
2. The status monitoring system according to claim 1, wherein the portable second communication device is provided inside an upper structure that is provided on the hull and has a non-metallic wall surface; the wireless signal from the first communication device can reach the inside of the upper structure via the non-metallic wall surface.
3. The status monitoring system according to claim 1, wherein the portable second communication device is operated by electric power of a secondary battery, and the status monitoring system further comprises a charging device provided inside an upper structure and used for charging the portable-secondary battery of the portable second communication device.
4. A marine vessel comprising:
a metal hull;
a main engine and a steering device, which are devices to be monitored stored within the hull; and
the status monitoring system according to claim 1.
5. A status monitoring method comprising:
a first step of measuring a status of a device to be monitored stored within a metal hull that is included by a marine vessel, the first step being performed by a measuring device;
a second step of acquiring a status signal from a signal processing device that is provided inside the hull for wired or wireless communication, the status signal indicating a measurement value of the status of the device to be monitored, the hole being included by a deck that covers an upper part of the hull, the second step being performed by a first communication device that is provided outside the hull;
a third step of transmitting the acquired status signal using a first channel, the first channel being selected by a user of a portable second communication device for setting one of transmission channels for the status signal, the third step being performed by the first communication device;

a fourth step of setting a second channel according to selection of the second channel by the user, the second channel being a reception channel that is configured to receive a signal through a transmission channel set for one of marine vessels when each of the transmission channels set for the marine vessels is a different channel, the fourth step being performed by the portable second communication device;

a fifth step of transmitting the selected first channel for the status signal to the first communication device, the fifth step being performed by the portable second communication device;

a sixth step of generating a display screen based on the received status signal via the first communication device, the sixth step being performed by the portable second communication device; and a seventh step of outputting the screen to a display unit, the seventh step being performed by the portable second communication device.

* * * * *